US007849456B2

(12) United States Patent
Boden et al.

(10) Patent No.: US 7,849,456 B2
(45) Date of Patent: Dec. 7, 2010

(54) METHOD, SYSTEM AND COMPUTER PROGRAM PRODUCT FOR SYNCHRONIZING SOURCE CODE REPOSITORIES

(75) Inventors: Edward B. Boden, Highland, NY (US); Daniel J. Gorey, Endwell, NY (US)

(73) Assignee: International Business Machines Corporation, Armonk, NY (US)

( * ) Notice: Subject to any disclaimer, the term of this patent is extended or adjusted under 35 U.S.C. 154(b) by 1224 days.

(21) Appl. No.: 11/421,514

(22) Filed: Jun. 1, 2006

(65) Prior Publication Data

US 2007/0283323 A1 Dec. 6, 2007

(51) Int. Cl.
G06F 9/44 (2006.01)
G06F 7/00 (2006.01)
G06F 17/00 (2006.01)
(52) U.S. Cl. .................. 717/170; 717/120; 717/122; 707/203; 707/638
(58) Field of Classification Search .............. 717/122, 717/168, 170; 707/203
See application file for complete search history.

(56) References Cited

U.S. PATENT DOCUMENTS

| | | | | |
|---|---|---|---|---|
| 5,481,722 | A * | 1/1996 | Skinner | 717/122 |
| 7,185,332 | B1 * | 2/2007 | Waldin et al. | 717/170 |
| 2002/0116702 | A1 * | 8/2002 | Aptus et al. | 717/170 |
| 2003/0158871 | A1 * | 8/2003 | Fomenko | 707/203 |
| 2003/0204557 | A1 * | 10/2003 | Mandal et al. | 709/202 |
| 2004/0133444 | A1 * | 7/2004 | Defaix et al. | 705/1 |
| 2004/0215646 | A1 * | 10/2004 | Kaler et al. | 707/100 |
| 2005/0044531 | A1 * | 2/2005 | Chawla et al. | 717/122 |
| 2005/0071838 | A1 * | 3/2005 | Hatasaki | 717/168 |
| 2007/0226728 | A1 * | 9/2007 | Thorson et al. | 717/168 |

OTHER PUBLICATIONS

Nguyen, "Model-based Version and Configuration Management for a Web Engineering Lifecycle", May 2006, ACM, pp. 437-446.*
Conradi et al, "Version Models for Software Configuration Management", ACM Computing Surveys, vol. 30, No. 2, Jun. 1998, pp. 232-282.*
Nguyen et al, "An Infrastructure for Development of Object-Oriented, Multi-level Configuration Management Services", May 2005, ACM, pp. 215-224.*
Reichenberger, "Orthogonal Version Management", 1989, ACM, pp. 137-140.*
Conradi et al, "Version Models for Software Configuration Management", ACM, 1998, pp. 232-282.*

(Continued)

*Primary Examiner*—Wei Y Zhen
*Assistant Examiner*—Charles Swift
(74) *Attorney, Agent, or Firm*—Cantor Colburn LLP; William Kinnaman

(57) ABSTRACT

A method for synchronizing an original code base (OCB) with a superset code base (SCB) which is a superset of the OCB. The method includes obtaining the OCB, obtaining the SCB and determining a file pair difference between the OCB and the SCB. An action table is accessed to retrieve actions based on a classification of each OCB file, a classification of each SCB file, and file pair difference. The actions are assembled into an action file. The actions in the action file are executed to synchronize the OCB and the SCB.

10 Claims, 4 Drawing Sheets

OTHER PUBLICATIONS

Ochuodho et al, "A Process-Oriented Version and Configuration Management Model for Communications Software", 1991, ACM, pp. 109-120.*

Thomas, "Version and Configuration Management on a Software Engineering Database." 1989, ACM, pp. 23-25.*

Doherty et al, "Structures for Manipulating Proposed Updates in Object-Oriented Databases", 1996, ACM, pp. 306-317.*

Nguyen et al, "An Infrastructure for Development of Object-Oriented, Multilevel Configuration Management Services", May 2005, ACM, pp. 215-224.*

* cited by examiner

| situation | | Superset code base | | | | | |
|---|---|---|---|---|---|---|---|
| | | new (add) 0 | rmv 1 | updated 2 | exists & not pending 3 | exists & pending 4 | does not exist 5 |
| Original code base | new (add) 0 | noop, ci, +pc | add & ci, add & ci, add & ci | noop, ci, +pc | noop, ci, ci | -pc, ci & -pc, by hand | add & ci |
| | rmv 1 | +pc, +pc, +pc | noop, noop, noop | +pc, +pc, +pc | +pc, +pc, +pc | noop, noop, noop | noop |
| | updated 2 | noop, ci, +pc | add & ci, add & ci, add & ci | noop, ci, +pc | noop, ci, ci | -pc, ci & -pc, by hand | add & ci |
| | exists 3 | noop, ci, +pc | add & ci, add & ci, add & ci | noop, ci, +pc | noop, ci, ci | -pc, ci & -pc, by hand | add & ci |
| | does not exist 4 | +pc | noop | +pc | +pc | noop | - - |

FIG. 4

METHOD, SYSTEM AND COMPUTER PROGRAM PRODUCT FOR SYNCHRONIZING SOURCE CODE REPOSITORIES

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to synchronizing source code, and particularly to synchronizing independently updated source repositories.

2. Description of Background

The source code for software projects of all kinds (commercial, private, academic, governmental, open source, etc.) is routinely, universally, kept in specialized source code databases or repositories. Source code is represented as text files. Major software projects can have many thousands of such files, and scores of programmers making changes to various ones of these files. The primary purpose of source code repositories is to control and track changes to the source code and related (e.g., build, XML, configuration, documentation, test data, etc.) files. Various code control repositories are in widespread use (e.g. RCS (Revision Control System), SCCS (Source Code Control System), CVS (Concurrent Versions System), Subversion, CMVC (Configuration Management Version Control), Rational's ClearCase, Microsoft's Visual SourceSafe, etc.).

In the large and growing world of open source, CVS is the most common, with Subversion gaining ground. For example, SourceForge's 116,000+ registered projects use CVS. There are two defining dimensions to open source; the ability to access (read) & use (reuse) the source code, and the ability to update (write) the source code. Sometimes in an open source project there are occasions when the second ability is perceived as limited for various reasons. In such cases, the first aspect of open source is exploited to 'fork' the code. That is, the group desiring a different direction can make their own copy in their own repository and then proceed in parallel, perhaps completely independently, of the original code base. The two (or more) code bases will diverge over time, and this can result in incompatibilities and inconsistencies as exploiters (including businesses) of the code try to choose which path to follow. The developers of the original code base must also often make a decision to commit their time to one or the other. A desirable feature that shows up in the original can be difficult to include in the other. These kinds of eventualities tend to marginalize the original code base and its impacts on IT can be lessened. Hence, though the ability to fork has been termed the essence of open source, actually doing so is generally considered undesirable, as it also tends to split the efforts of everyone involved.

At the same time, the pressure and advantages of forking a code base can be quite compelling. Thus, there is a need in the art to provide the advantages of forking without incurring, or at least mitigating, the disadvantages.

SUMMARY

The shortcomings of the prior art are overcome and additional advantages are provided through the provision of a method for synchronizing an original code base (OCB) with a superset code base (SCB) which is a superset of the OCB. The method includes obtaining the OCB, obtaining the SCB and determining a file pair difference between the OCB and the SCB. An action table is accessed to retrieve actions based on a classification of each OCB file, a classification of each SCB file, and file pair difference. The actions are assembled into an action file. The actions in the action file are executed to synchronize the OCB and the SCB.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which automates synchronization of an original code base with a superset code base.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 4 illustrates one example of actions taken during synchronizing source code.

The detailed description explains the preferred embodiments of the invention, together with advantages and features, by way of example with reference to the drawings.

DETAILED DESCRIPTION OF THE INVENTION

Figure 1:
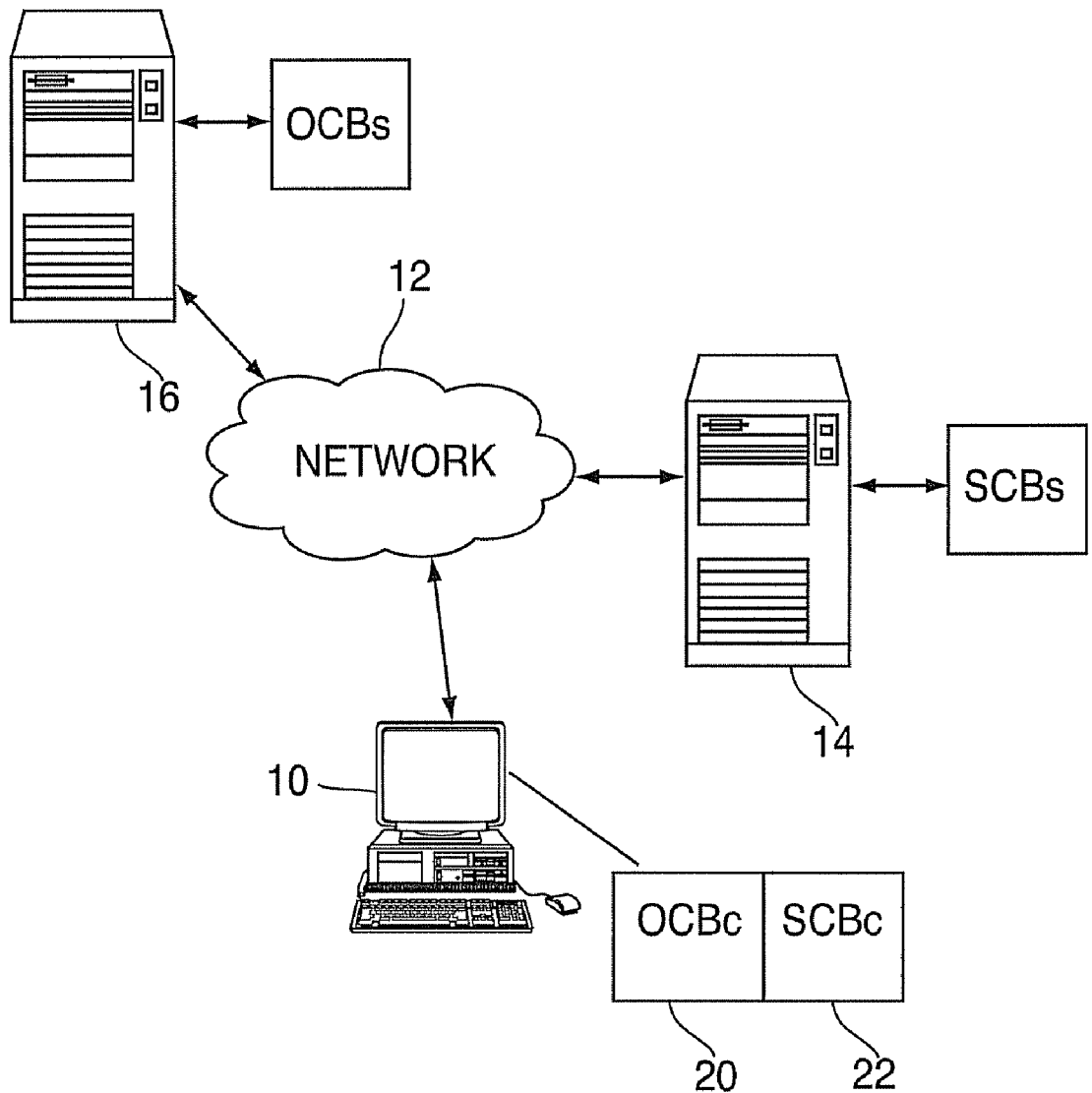
FIG. 1 illustrates one example of a system for synchronizing source code.

FIG. 1 illustrates an exemplary system operating environment for synchronizing source code. The system includes a client system 10 communicating with original code server 16 and superset code server 14 via a network 12. The client system may be implemented using known systems such as a personal computers, workstation, etc. Servers 16 and 14 may be implemented using known server systems. Network 12 may be implemented using known communications networks such as intranet, Internet, WAN, LAN, etc. The original code sever 16 maintains an original code base repository in a database and the superset code server 14 maintains a superset code base repository in a database.

The client system 10 may make a copy of the original code base, OCB 20 to create an initial superset code base, SCB 22. Thereafter, the client system 10 obtains the SCB 22 from the superset code server 14. The client system 10 executes a code control application, such as CVS, to maintain the superset code base 22. A superset is a set that includes other sets within it, which are called subsets. For example, a software or hardware upgrade may be a superset of the previous version in that it can do everything the previous version can do and more.

In FIG. 1, the client system 10 stores a copy of a server OCB (OCBs), the copy referred to as client OCBc. The client system 10 desires to create a superset code base, SCB, referred to locally at the client as SCBc. The client code SCBc may be stored on the SCB server 14 as SCBs. As noted above, a fork (diverging copies) has disadvantages. These disadvantages are addressed by embodiments of the invention by reducing the costs of maintaining a copy of the original code base as a superset of the directory tree, where each directory has some number of source code files and some number of additional directories, to useful level through automation.

The basic idea is that OCB and SCB are not simply diverging code bases, but that SCB is generally a superset of OCB, and periodically changes in OCB are moved to SCB, such that SCB is maintained as a superset of OCB. The movement of changes is automated to an extent such that the amount of manual-intervention is minimized. The manual intervention is minimized by various factors. These factors are the SCB is treated as a superset of OCB, by the frequency of periodic automatic synchronization (e.g. every 24 hours, every hour, triggered directly by updates to OCB or SCB, etc.), by the degree of files differences that are automated, and by the level of scale (or scope) over which the automation is run. On the latter point, for example, different level of scope are desirable due to the length of time the OCB and SCB synchronization takes to run when run over the entire code bases. Hence it may be sufficient and desirable to run the automation for particular subtrees of directories of overall code base, or particular files.

Figure 2:
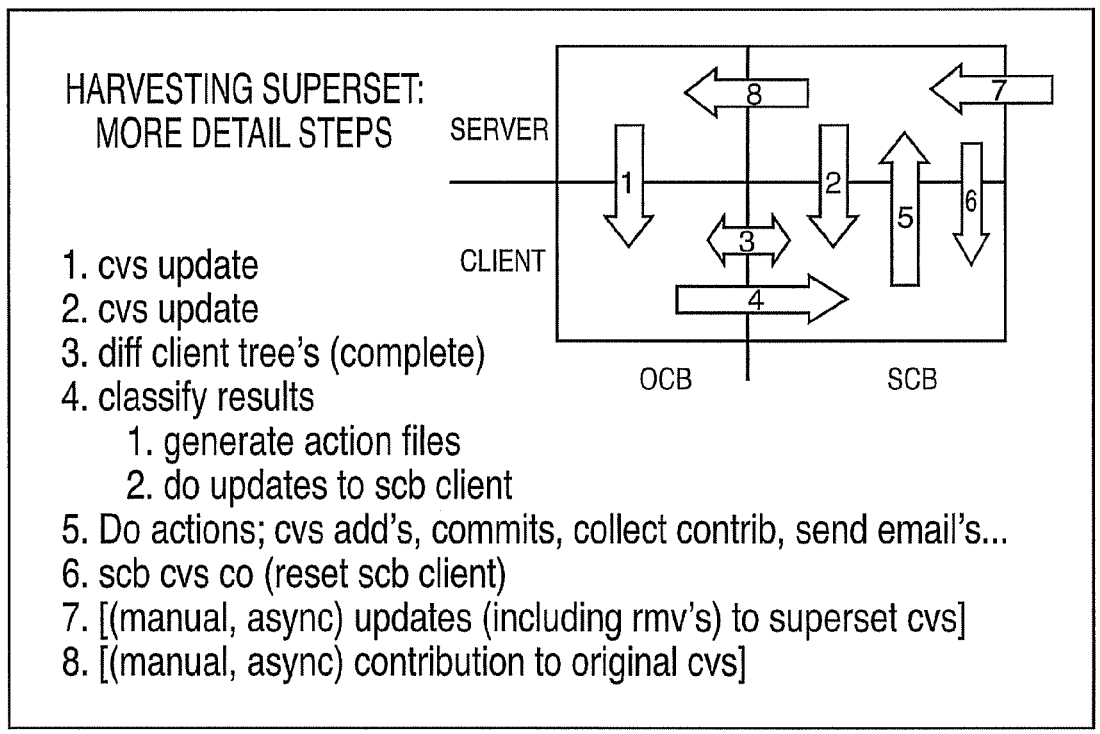
FIG. 2 illustrates one example of a process for synchronizing source code.
Figure 3:
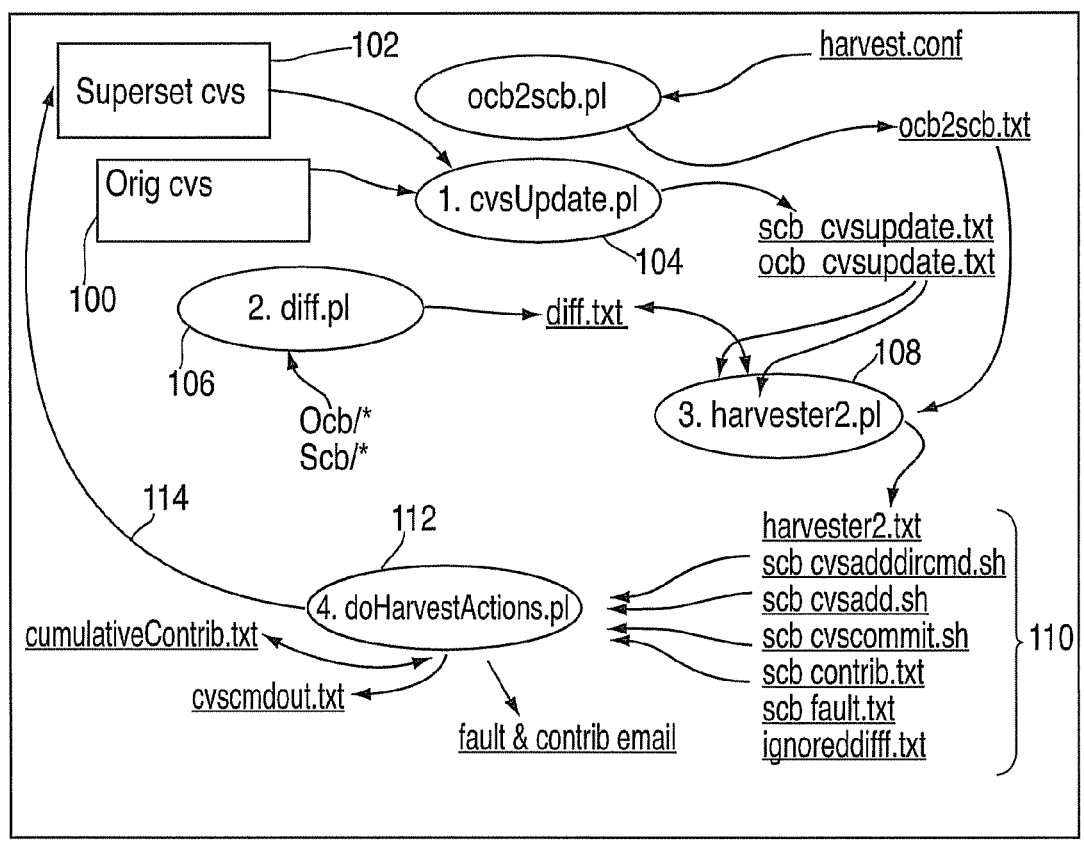
FIG. 3 illustrates one example of a process for synchronizing source code.

FIG. 2 illustrates one example of a process for synchronizing source code. FIG. 2 illustrates process steps 1-8. Step 1 illustrates an update of the OCB 22 from OCB server 16 to client 10. The update is performed by the code control application on client 10, which in the illustrated example is CVS. It is understood that other code control applications may be used. Step 1 obtains a fresh update of the OCB. Step 2 similarly obtains a fresh update of the SCB 22 from the SCB server 14. This step may include copying the OCB 20 as a separate SCB 22 if no SCB exists yet. FIG. 3 illustrates components of FIG. 2. As shown in FIG. 3, the OCB 100 and SCB 102 are obtained through an update operation 104.

At step 3, a differencing operation is performed to detect any differences between the SCB and the OCB. As noted above, the goal is to detect changes in the OCB and move these changes to the SCB to maintain the SCB as a superset of the OCB. This differencing may be performed by comparing the tree structures of the OCB 20 and the SCB 22 to detect differences at the line level of the code. The differencing operation is represented in FIG. 3 as component 106, which generates a difference result file, labeled diff.txt.

At step 4 of FIG. 2, the difference results are part of the input to the classification, which is used to generate action files. As described in further detail herein, the actions for the action files are retrieved through an action table as shown in FIG. 4. The action table and the various actions defined are described in further detail herein with reference to FIG. 4. Step 4.2 refers to the logical copying of OCBc changes to SCBc. Generation of the action files is represented in FIG. 3 as component 108 that generates action files 110. At step 5 of FIG. 2, the actions are performed to update the OCB 20 and SCB 22. In FIG. 3, the execution of the actions 110 is represented by component 112. The actions are described in further detail with reference to FIG. 4.

At step 6 of FIG. 2, the code control application on client 10 performs an SCB checkout procedure that exits the update routine and refreshes SCBc 22 from the SCBs updated in step 5. This is an example of a step that is particular to CVS, and may not be needed with other source code control implementations. This refresh is illustrated in FIG. 3 as arrow 114 back to superset SCB 102.

Steps 7 and 8 in FIG. 2 illustrate manual updates to the SCB or the OCB, respectively. These are the updates to the source codes that are then automatically adjusted for by steps 1-6.

FIG. 4 illustrates an exemplary action table which is used to generate action files executed to synchronize the SCB to the OCB. The table shows, given various situations per file of the original code base (OCB) and the superset code base (SCB), what action is to be taken by the automation. Abstractly, this is treated as a classification problem; every file in OCB and SCB is classified according to this table. As each file is classified, the indicated codes in the table are used to assemble the action files that are executed to synchronize the SCB and OCB.

As shown in FIG. 4, each file is characterized for both the SCB and OCB. The files may be classified as new, removed (rmv), updated, exists and not pending, exists and pending or does not exist. The reference to pending and not pending refers to whether the file is pending contribution to the OCB or not. In other words, the pending contribution list is a list of files that comprise the superset of the superset code base. That is, either the whole of each file, or parts of it are not in the original code base. This list is included in the output of each execution of the move of changes, and provides visibility to help manage the manual costs.

Depending on the classification of the OCB and SCB files, and the degree of difference between these files, different actions are directed by the action table. In some cells of the table, three entries are found corresponding to three different degrees of difference between the OCB file and the SCB file. The first entry is retrieved if the OCB file and the SCB file match. The second entry is retrieved if the OCB file and SCB file do not match, but the OCB file is a subset of the SCB file. The third entry is retrieved if the OCB and SCB file do not match, and the OCB file is a subset of the SCB file. In the last row of the table the file does not exist in the OCB. In the last column of the table, the file does not exist in the SCB. In these cells, there is only one action entry as two file differences cannot be computed.

The actions in the table are defined below. The specific references to CVS are examples only, and assume the original and superset code base are maintained by CVS. Other code control applications may be used in place of CVS.

Action notation:
+pc=add file to pending contribution list;
−pc=remove file from pending contribution list;
ci=execute a CVS commit (check in) of ocb file;
noop='no operation' (do nothing);
by hand=notify an individual (e.g., via automatically generated email) to synchronize the OCB and SCB files manually;
add=do CVS part add (and any necessary dir's).

Although the actions include manual operations to synchronize the SCB and the OCB, the majority of the actions are automatically implemented and greatly reduce the effort in maintaining the SCB as a superset of the OCB.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for synchronizing an original code base (OCB) with a superset code base (SCB) which is a superset of the OCB, the method comprising:
   obtaining the OCB;
   obtaining the SCB;
   determining a file pair difference between the OCB and the SCB;
   accessing an action table to retrieve actions based on a classification of each OCB file, a classification of each SCB file, and file pair difference, wherein the actions in the action table identify a plurality of file operations and wherein each classification of the OCB and SCB files classifies the file as any one of: new, removed, updated, exists or not pending;
   assembling the actions into an action file; and
   executing the actions in the action file to synchronize the OCB and the SCB;
   wherein the action table includes cells indexed by the classification of the OCB file and the classification of the SCB file, each cell includes a plurality of actions;
   wherein retrieving actions includes selecting one of the actions in the cell in response to the difference.

2. The method of claim 1 wherein:
   obtaining the OCB includes obtaining a copy of the OCB from an OCB server maintaining an OCB repository.

3. The method of claim 1 wherein: obtaining the SCB includes obtaining a copy of the SCB from an SCB server maintaining an SCB repository.

4. The method of claim 1 wherein: obtaining the SCB includes making a copy of the OCB.

5. The method of claim 1 wherein: the difference between the OCB and the SCB is determined by comparing a directory tree of the OCB with a directory tree of the SCB.

6. A computer program product for synchronizing an original code base (OCB) with a superset code base (SCB) which is a superset of the OCB, the computer program product comprising:
   a storage medium; and
   program instructions stored on the storage medium for implementing:
   obtaining the OCB;
   obtaining the SCB;
   determining a file pair difference between the OCB and the SCB;
   accessing an action table to retrieve actions based on a classification of each OCB file, a classification of each SCB file, and file pair difference wherein the actions in the action table identify a plurality of file operations and wherein each classification of the OCB and SCB files classifies the file as any one of: new, removed, updated, exists or not pending;
   assembling the actions into an action file; and
   executing the actions in the action file to synchronize the OCB and the SCB;
   wherein the action table includes cells indexed by the classification of the OCB file and the classification of the SCB file, each cell includes a plurality of actions;
   wherein retrieving actions includes selecting one of the actions in the cell in response to the difference.

7. The computer program product of claim 6 wherein: obtaining the OCB includes obtaining a copy of the OCB from an OCB server maintaining an OCB repository.

8. The computer program product of claim 6 wherein: obtaining the SCB includes obtaining a copy of the SCB from an SCB server maintaining an SCB repository.

9. The computer program product of claim 6 wherein: obtaining the SCB includes making a copy of the OCB.

10. The computer program product of claim 6 wherein: the difference between the OCB and the SCB is determined by comparing a directory tree of the OCB with a directory tree of the SCB.

* * * * *